United States Patent [19]

Willyard et al.

[11] Patent Number: 4,929,464

[45] Date of Patent: May 29, 1990

[54] FROZEN DONUT BATTER AND METHOD FOR PREPARING COOKED PRODUCT THEREFROM

[75] Inventors: Marvin R. Willyard, Franklin; Jean M. Lingg, Hales Corners, both of Wis.

[73] Assignee: Ph. Orth Co., Oak Creek, Wis.

[21] Appl. No.: 329,357

[22] Filed: Mar. 27, 1989

[51] Int. Cl.$^5$ ............................................... A21D 6/00
[52] U.S. Cl. ................................... 426/549; 426/439; 426/499; 426/524; 426/551; 426/553
[58] Field of Search ............... 426/551, 524, 553, 549, 426/439, 499

[56] References Cited

U.S. PATENT DOCUMENTS 3,479,188 11/1969 Thelen .................................. 426/19

Primary Examiner—Donald E. Czaja
Assistant Examiner—Mary S. Mims
Attorney, Agent, or Firm—Arnold J. Ericsen; C. Thomas Sylke

[57] ABSTRACT

A donut batter is described, along with the use of the batter to provide frozen, uncooked cake donuts which may be reconstituted quickly in a deep fryer. The batter consisting preferably of cake and bread flours, sucrose, shortening, a chemical leavening system and other ingredients is admixed with an amount of water which will allow proper mixing of the ingredients and the ability of the stiff batter to withstand shaping, freezing, shipping and storage. The frozen donut is reconstituted without thawing and proofing by immersing the product in cooking oil for about 100 seconds at 350° F. Flavoring can be added to the donut, and the finished product may be dusted or topped with other materials conventionally used in the preparation of cake donuts by other techniques. The selection of the cross-sectional diameter of the frozen donuts is an important factor in the process of the present invention to ensure proper exterior texture and color and proper interior doneness.

9 Claims, No Drawings

FROZEN DONUT BATTER AND METHOD FOR PREPARING COOKED PRODUCT THEREFROM

BACKGROUND OF THE INVENTION

1. Field of the Invention

The present invention relates to the food art, and in particular to the preparation of a donut batter which can be frozen and subsequently reconstituted, without thawing, in a deep oil fryer. Still more specifically, the invention relates to the preparation of a frozen cake donut mix, including a leavening system, and processing steps which allow the unique dough to be formed, frozen, shipped, stored and reconstituted to form finished products having very desirable properties.

2. Description of the Prior Art

The prior art known to the present inventors is quite limited due to the fact that they believe themselves to be the first to be able to provide frozen batter cake donuts of the kind where reconstitution occurs without thawing.

Chemically leavened batters have been previously prepared for products such as muffins, cookies or brownies. In the past, however, these products used conventional formulas for the batters, and product preparation included allowing the batter to thaw, placing it in a pan and baking the dough in the same way as if it were fresh. Some unleavened systems, e.g. pie crusts, have been deep fried without thawing.

In the donut industry, yeast batters for raised donuts (as opposed to cake donuts) have been prepared. The formulations are totally distinct from those used in conventional cake donut mixes or the batters of the present invention. Like other frozen dough systems known to the present inventors, these yeast raised systems require thawing and proofing before frying, all of which can take 1½ to 2 hours or more.

It would represent a significant advancement in the art to provide a cake donut batter which could be frozen and reconstituted, without thawing or proofing, by deep frying. Such products could be cooked on demand by simply removing from the freezer enough preformed donuts for the customer demand and cooking them. Advance preparation for peak demand periods and the space requirements for thawing and proofing dough products would be eliminated.

OBJECTS AND SUMMARY OF THE INVENTION

It is the primary object of the present invention to provide a cake donut batter which may be frozen and subsequently reconstituted in a deep fryer without thawing.

Another object of the present invention is to provide a cake donut batter which may be formed, frozen, packaged, shipped, stored and reconstituted without deterioration of product shape.

A further object of the present invention is to provide a process for the preparation of cake donuts which employs the steps of preparing a batter, forming the batter, freezing the formed product and reconstituting the donut without thawing.

A still further object of the present invention is to provide a cake donut preparation system which can be used for a variety of different flavors of cake donuts and where the reconstituted, fried product can be dusted or coated with comestibles known in the cake donut art.

A different object of the present invention is to provide a cake donut batter which is lower in water content than previously known cake donut batters and which gives desirable end products from the standpoint of flavor, color and texture.

How these and other objects of the present invention are accomplished will be described in the following detailed description of the preferred embodiment, taken in conjunction with the formula and processing variables also discussed. Generally, however, the various objects are accomplished by providing a dry mix of cake donut ingredients including various flours, sucrose, nonfat dry milk, salt, egg yolk, a chemical leavening system, moisturizers, flavors, emulsifiers and shortening, as well as other minor ingredients. The dry mix is blended with water to form a stiff batter which is then formed into donut shaped products having carefully selected cross-sectional diameters. The products are frozen and packaged in ways which will be described later herein. For reconstitution, the frozen products are immersed in a deep fryer, unthawed, and cooked in a short period of time (e.g., about 100 seconds), following which the cooked product can be topped with sugar or other toppings known to the art. Further ways in which the objects of the invention can be accomplished will become readily apparent to those skilled in the art after the following detailed description is read and understood. Such further ways are deemed to fall within the scope of the present invention if they fall within the scope of the claims which follow the description.

DESCRIPTION OF THE PREFERRED EMBODIMENT

Before proceeding to the detailed description of the best mode of carrying out the invention known to the inventors as of the time of filing this application, let it first be understood that while the invention is being described in connection with cake donuts having a central hole, i.e. a conventional annular donut, the invention is not to be so limited. One example of another shape into which the batter of the present invention can be formed would be cake sticks. In other words, the shape of the final product is not critical to the present invention, so long as the cross-sectional diameter of the product is selected to ensure a crisp outer texture (preferably non-greasy) of good color and a thoroughly cooked interior. Also, while the ingredients listed herein are for the preferred batter, other ingredients can be used as is known in the baking industry. For example, while the particular flour mixture discussed below is believed to be novel for cake donuts, various other flours can be added and the proportions could be varied.

As with the flour component, the emulsifier, shortening, leavening system and flavors can be modified by one skilled in the art after reading and understanding the present invention. The present formulation is for a vanilla flavor product but others, such as chocolate, can be employed.

In the formula below it will be noted that the largest ingredient is cake flour at a pH of 4.6. Most cake donut mixes use less of this particular type of flour and at a higher pH. Also to be noted is the relatively high total amount of emulsifiers (diglyceride, propylene glycol monoesters and mono and diglycerides) compared to most known cake donut formulas. Roughly twice as much of these ingredients are used in the preferred formula. The exact nature of the effect of the various constituents on final product characteristics is not known, but those skilled in the dry mix donut industry will be able to readily substitute various components for one another. Still other examples of substitutions which can be made include whey products for the nonfat dry milk, high fructose corn syrup for the sucrose, etc. The following chart shows the preferred batter premix of the present invention.

TABLE I

Ingredients For 100 lbs Dry Mix and Ranges Useful For Preparing Frozen Cake Donut Batter

| Ingredient | Weight | Weight % | Range |
|---|---|---|---|
| Cake Flour pH 4.6 | 33 lbs 12 oz | 33.7346 | ±5.00% |
| Bread Flour | 20 lbs 7 oz | 20.4346 | ±5.00% |
| Sucrose | 27 lbs 1 oz | 27.0500 | ±5.00% |
| Soya Flour | 4 lbs 3 oz | 4.8300 | ±3.00% |
| Nonfat Dry Milk | 2 lbs 9 oz | 2.5800 | ±2.00% |
| Salt | 1 lb 1 oz | 1.0500 | ±1.00% |
| Dried Egg Yolk | 1 lb 13 oz | 1.8000 | ±.50% |
| Soda | 0 lb 11 oz | .7000 | ±1.00% |
| Sapp 401 | 0 lb 13 oz | .8000 | ±.30%[2] |
| Sodium Aluminum Phosphate | 0 lb 13 oz | .4800 | ±.30%[2] |
| Gel Wheat Starch | 0 lbs 15 oz | .9200 | ±.50% |
| Mace Oil | 30 cc | .0654 | As needed[3] |
| Nutmeg Pure Ground | 0 lbs 1 oz | .9200 | As needed[3] |
| Mono and Di (52% -mono) diglyceride | 0 lbs 10 oz | .6200 | ±.3 oz[4] |
| Xanthan Gum | 0 lbs 2 oz | .1000 | |
| Gum Guar | 0 lbs 2 oz | .1000 | |
| Diglyceride 80% | 0 lbs 4 oz | .2600 | ±.2600%[4] |
| Propylene Glycol Mono Ester | 0 lbs 4 oz | .2600 | ±.2600%[4] |
| Hydrogenated Veg. Shortening | 4 lbs 8 oz | 4.5000 | ±2.00 lbs |
| | 100 lbs 7 oz | 100.35 | |

[1]Sapp is a trademark of Monsanto Corporation for its sodium acid pyrophosphate chemical leavening acid.
[2]Sapp 40 and Sodium Aluminum Phosphate balanced with basic soda leavening agent.
[3]Flavors - amounts could vary widely depending on flavor chosen.
[4]Emulsifier system in this preferred embodiment in larger amounts than typically used in cake donut formulas.

In the preferred embodiment of the invention the dry and liquid ingredients mentioned in the above chart are blended together at a preferred temperature of about 65-70° F., following which water is added at about the same temperature. In the most preferred embodiment 33 lbs of water are added, which in bakery terminology give a water absorption of 33%. While the amount of water can be varied (e.g., 32-34 lbs), the water utilization is very low compared to normal cake donut mixes, which typically have water absorption percentages closer to 40% (e.g. 37-44%). The batter which results from the present invention is very thick in consistency. The batter should be maintained at a low enough temperature to avoid leavening effects, and preferably the batter is used immediately to form donuts in the manner described below. Mixing time for the dry ingredients plus water is 1 minute at slow speed and 1 minute at medium speed.

The next step in the process of the invention is to form the batter into the desired shape, e.g. donuts formed from 1⅛" inch gem cutters. In our preferred embodiment the scale weight of the donuts is 0.6 oz (7.2 oz/dozen). We have decided that the best packaging technique consists of laying the donuts on sheets of wax paper in a 6×10 configuration. After configuring the product it is next quick frozen in a blast freezer to reach an internal donut temperature of 5° F. or lower.

Since even at the frozen temperature mentioned above the donuts will have some elasticity and a tendency to deform under load, we believe that stacking no more than six 6×10 sheets in a corrugated shipping container is the optimum shipping procedure.

While shelf life of a frozen product may be six months or longer, a sixteen week freezer life is recommended. Furthermore, it is important that the product be frozen (5° F. or less) prior to frying, even though product degradation will not occur if thaw-freeze cycles occur prior to final use. This is the case if the internal temperature does not exceed 40° F. We have found that some formation losses and minimal losses in volume can occur if any such thaw-freeze cycles are encountered.

When it is desired to cook the cake donuts of the present invention, the rings are removed from the paper sheeting and are immersed in cooking oil. Any of the known cooking oils used for deep frying may be employed, such as lard, various shortenings and the many types of vegetable oils now being used. The product will have a tendency to rise to the top of the oil as the leavening system works, and it is most desirable to employ any type of device (for example a slotted spoon or another basket if the rings are being fried in a first basket) to keep the product submerged until it is done.

It has been determined that the preferred size for the frozen donut rings is ¼ inch in cross-section, although the amount could vary, say for example by ±⅛ inch. The small diameter allows the product to cook thoroughly when immersed for about 100 seconds at 350° F. Cooking times and temperatures may vary slightly depending on the regenerative capacity of the deep fryer, the number of rings being cooked and other factors well known to the art. Ideally, the finished product will have a medium brown, somewhat crisp exterior and a flaky interior illustrating that complete cooking has been accomplished.

Following removal of the product from the fryer, the donuts may be coated with powdered sugar, sugar/cinnamon, chocolate, etc. The coating or dusting steps are, of course, optional as many people enjoy the flavor of plain cake donuts.

Another important attribute of the product of the present invention is its shelf life after cooking. Under standard heat lights of the kind frequently seen in fast food restaurants, the product retains its original desirably properties for up to 60 minutes. Perforated folding cartons can be used for storage of the warm donuts for 2 hours or more. In addition, the fried product can be reheated by microwave. Six of the rings can be heated to an internal temperature of 150° F. at a medium temperature setting of a microwave oven set for 20 seconds.

What has been accomplished by the present invention is a substantial breakthrough for the many types of outlets which previously have desired to serve cake donuts but did not desire to put up with the problems of making them from scratch or of thawing and proofing batter. The products of the present invention can be enjoyed at home using popular electric deep fryers, or they can be fried and served at fast food restaurants where deep frying equipment is commonplace. Upscale restaurants and other institutional food service customers will also respond favorably to a new product which can be maintained for a long period of time but which requires only a short period of reconstitution.

While the present invention has been described by reference to a most preferred embodiment, it is not to be limited thereby but is to be limited solely by the scope of the claims which follow.

What is claimed is:

1. A process for preparing cake donuts consisting of a first step of preparing a cake donut batter, a second step of forming donuts from said batter, a third step of freezing said formed donuts, and a final step of deep frying said donuts without thawing same and wherein the cross-sectional area of said donuts is selected to permit adequate interior cooking before the exterior of said donut becomes overcooked.

2. The process of claim 1 wherein said batter has a water absorption of between about 32% and about 34%.

3. The process of claim 1 wherein said water absorption is about 33%.

4. The process of claim 1 wherein the cross-sectional diameter of said donuts is approximately ½ inch.

5. The process of claim 1 wherein said frying step is accomplished in vegetable oil at about 350° F. for about 100 seconds.

6. The process of claim 1 wherein said freezing step causes the interior of said donuts to reach a temperature of 5° F. or less.

7. The process of claim 1 wherein said frying step begins while the interior temperature of said frozen donuts is 5° F. or less.

8. A process for making cake donuts consisting of preparing a cake donut batter having a water absorption of less than 34%, a second step of extruding said batter through a donut cutter to form donuts having cross-sectional diameters of approximately ½ inch, a third step of freezing said donuts so that the internal temperature thereof is 5 C. or less and a final step of frying said donuts by immersing them while still frozen in cooking oil.

9. The process of claim 8 wherein said immersing step is into vegetable cooking oil for about 100 seconds at 350° F.

* * * * *